(12) United States Patent
Wiedemeier et al.

(10) Patent No.: US 12,060,901 B1
(45) Date of Patent: Aug. 13, 2024

(54) PRESSURE LOCKING CLAMP

(71) Applicant: The United States of America, as represented by the Secretary of the Navy, San Diego, CA (US)

(72) Inventors: Brandon J. Wiedemeier, San Diego, CA (US); Jeffrey M. Lloyd, San Diego, CA (US); Salvador Serra, Spring Valley, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 17 days.

(21) Appl. No.: 18/172,135

(22) Filed: Feb. 21, 2023

(51) Int. Cl.
*F16B 2/10* (2006.01)

(52) U.S. Cl.
CPC ..................................... *F16B 2/10* (2013.01)

(58) Field of Classification Search
CPC .......................................................... F16B 2/10
USPC ........ 292/DIG. 41, DIG. 42, DIG. 43, 256.6, 292/256; 294/106, 92
See application file for complete search history.

(56) References Cited

U.S. PATENT DOCUMENTS

| | | | | |
|---|---|---|---|---|
| 3,883,929 | A * | 5/1975 | Fortsch | F16L 3/13 269/131 |
| 8,573,576 | B2 * | 11/2013 | Clark | B25B 5/04 269/157 |
| 10,508,668 | B2 * | 12/2019 | Ikushima | F16B 2/10 |
| 10,898,022 | B2 * | 1/2021 | Van Lieshout | F16B 2/10 |
| 11,680,590 | B1 * | 6/2023 | Wiedemeier | B25B 5/00 91/508 |

* cited by examiner

*Primary Examiner* — Robert Sandy
(74) *Attorney, Agent, or Firm* — Naval Information Warfare Center, Pacific; Kyle Eppele; Evan Hastings

(57) ABSTRACT

A pressure locking clamp includes a base, a hook arm, and a clasp arm. An imaginary central plane divides the base into a first and second half. The hook arm pivots on the first half of the base around a first axis parallel to the imaginary central plane. The clasp arm pivots on the second half of the base around a second axis parallel to the imaginary central plane. The hook and clasp arms each includes a lock contact area. In a closed state of the pressure locking clamp, the hook and clasp arms and the base together form an eye enclosure. In the closed state, pressure inside the eye enclosure presses the lock contact area of the clasp arm against the lock contact area of the hook arm, and this inhibits the hook and clasp arms from pivoting away from each other, reinforcing the eye enclosure.

20 Claims, 2 Drawing Sheets

PRESSURE LOCKING CLAMP

FEDERALLY SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 112561.

BACKGROUND OF THE INVENTION

There is a general need for a clamp that is easy to use and offers robust operation under a variety of environmental and load conditions.

SUMMARY OF THE INVENTION

A pressure locking clamp includes a base, a hook arm, and a clasp arm. An imaginary central plane divides the base into a first and second half. The hook arm pivots on the first half of the base around a first axis parallel to the imaginary central plane. The clasp arm pivots on the second half of the base around a second axis parallel to the imaginary central plane. The hook and clasp arms each includes a lock contact area. In a closed state of the pressure locking clamp, the hook and clasp arms and the base together form an eye enclosure. In the closed state, pressure inside the eye enclosure presses the lock contact area of the clasp arm against the lock contact area of the hook arm, and this inhibits the hook and clasp arms from pivoting away from each other, reinforcing the eye enclosure.

BRIEF DESCRIPTION OF DRAWINGS

Throughout the several views, like elements are referenced using like references. The elements in the figures are not drawn to scale and some dimensions are exaggerated for clarity.

DETAILED DESCRIPTION

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other systems and methods described herein as will be understood by one of ordinary skill in the art unless otherwise stated specifically.

Embodiments of the invention provide easily used clamps that offer robust operation under a variety of environmental and load conditions. When in a closed state, the disclosed clamp is self-locking with a high clamping force, especially when needed under a heavy load, but is still easy to release in a fully reversible operation transitioning back from the closed state to an open state, which is ready for clamping again. The disclosed clamp offers set and forget operation; once set in the closed state and put under load, the clamp provides the high clamping force autonomously as long as needed under the load.

Figure 1:
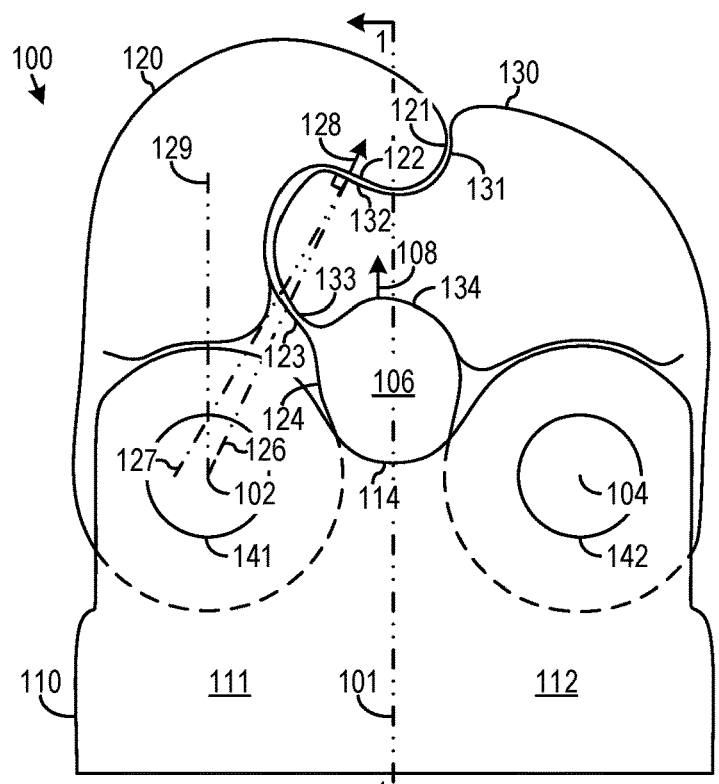
FIG. 1 is a side view of a pressure locking clamp in a closed state in accordance with an embodiment of the invention.
Figure 2:
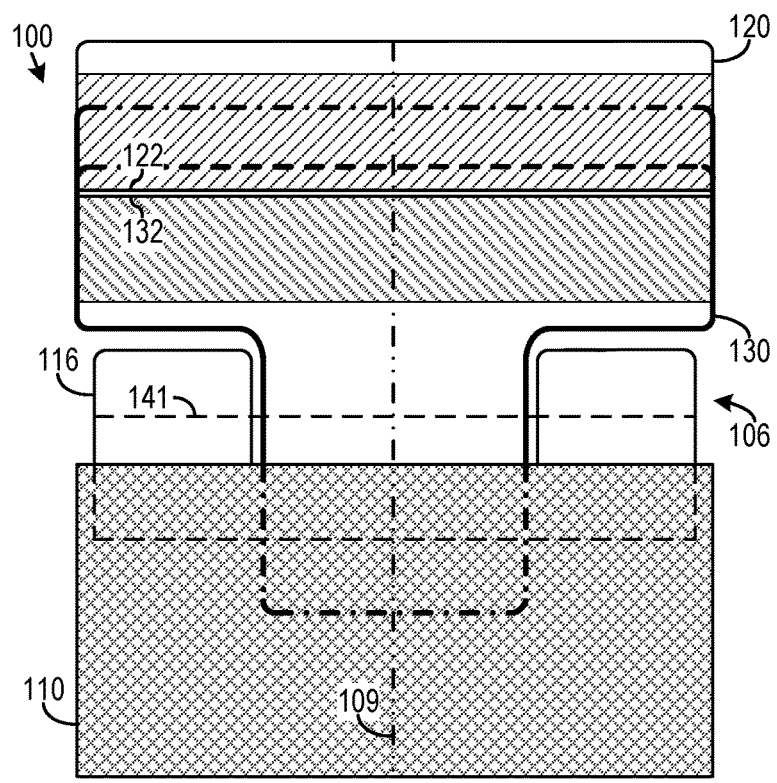
FIG. 2 is a cross section through the pressure locking clamp of FIG. 1 along section line 1-1.

FIG. 1 is a side view of a pressure locking clamp 100 in a closed state in accordance with an embodiment of the invention. FIG. 2 is a cross section through the pressure locking clamp 100 of FIG. 1 along section line 1-1. The section line 1-1 coincides with an imaginary central plane 101 dividing a base 110 into a first half 111 and a second half 112. The imaginary central plane 101 extends perpendicular to the page of FIG. 1 and coincides with the page of FIG. 2. The pressure locking clamp 100 includes the base 110, a hook arm 120, and a clasp arm 130.

The base 110 is for attaching to a support, such as a ship, a davit, a cargo container, or a pier. The base includes a restraint contact area 114 at a juncture between the first and second halves 111 and 112.

The hook arm 120 pivots on the first half 111 of the base 110 around a first axis 102 parallel to the imaginary central plane 101. The hook arm 120 includes a convex-tip contact area 121, a lock contact area 122, a limit contact area 123, and a restraint contact area 124 in this order from an extremity of the hook arm 120 to a shank of the hook arm 120 proximate the first axis 102.

The clasp arm 130 pivots on the second half 112 of the base 110 around a second axis 104 parallel to the imaginary central plane 101. The clasp arm 130 includes a concave-pocket contact area 131, a lock contact area 132, a limit contact area 133, and a restraint contact area 134 in this order from an extremity of the clasp arm 130 to a shank of the clasp arm 130 proximate the second axis 104.

In a closed state of the pressure locking clamp 100 as shown in FIG. 1, the hook and clasp arms 120 and 130 and the base 110 together form an eye enclosure 106. In particular, the restraint contact areas 114, 124, and 134 of the base 110 and the hook and clasp arms 120 and 130 together form the eye enclosure 106. Typically, the imaginary central plane 101 bisects the eye enclosure 106. Pressure 108 inside the eye enclosure 106 presses the lock contact area 132 of the clasp arm 130 against the lock contact area 122 of the hook arm 120. This inhibits the hook and clasp arms 120 and 130 from pivoting away from each other, reinforcing the eye enclosure 106.

For illustrative purposes, consider the scenario where the lock contact area 122 of the hook arm 120 is exactly perpendicular to an imaginary radial plane 126 transecting the lock contact area 122 of the hook arm 120 and containing the first axis 102 for pivoting the hook arm 120. Pressure 108 inside the eye enclosure 106 presses the lock contact areas 132 and 122 together, and this produces a force 128 on the hook arm 120 in a direction normal to the surface of the lock contact area 122. Thus, because this scenario assumes the lock contact area 122 is exactly perpendicular to the imaginary radial plane 126, the force 128 is a radial force directed away from the first axis 102 for pivoting the hook arm 120. This radial force 128 is opposed by an equal and opposite force arising at a bearing of the hook arm 120 for pivoting the hook arm 120 around the first axis 102. Thus, in this illustrative scenario for the closed state shown in FIG. 1, the pressure 108 inside the eye enclosure 106 does not impel pivoting of the hook arm 120 around the first axis 102 because the force 128 is a radial force along the radial direction within the imaginary radial plane 126.

Figure 3:
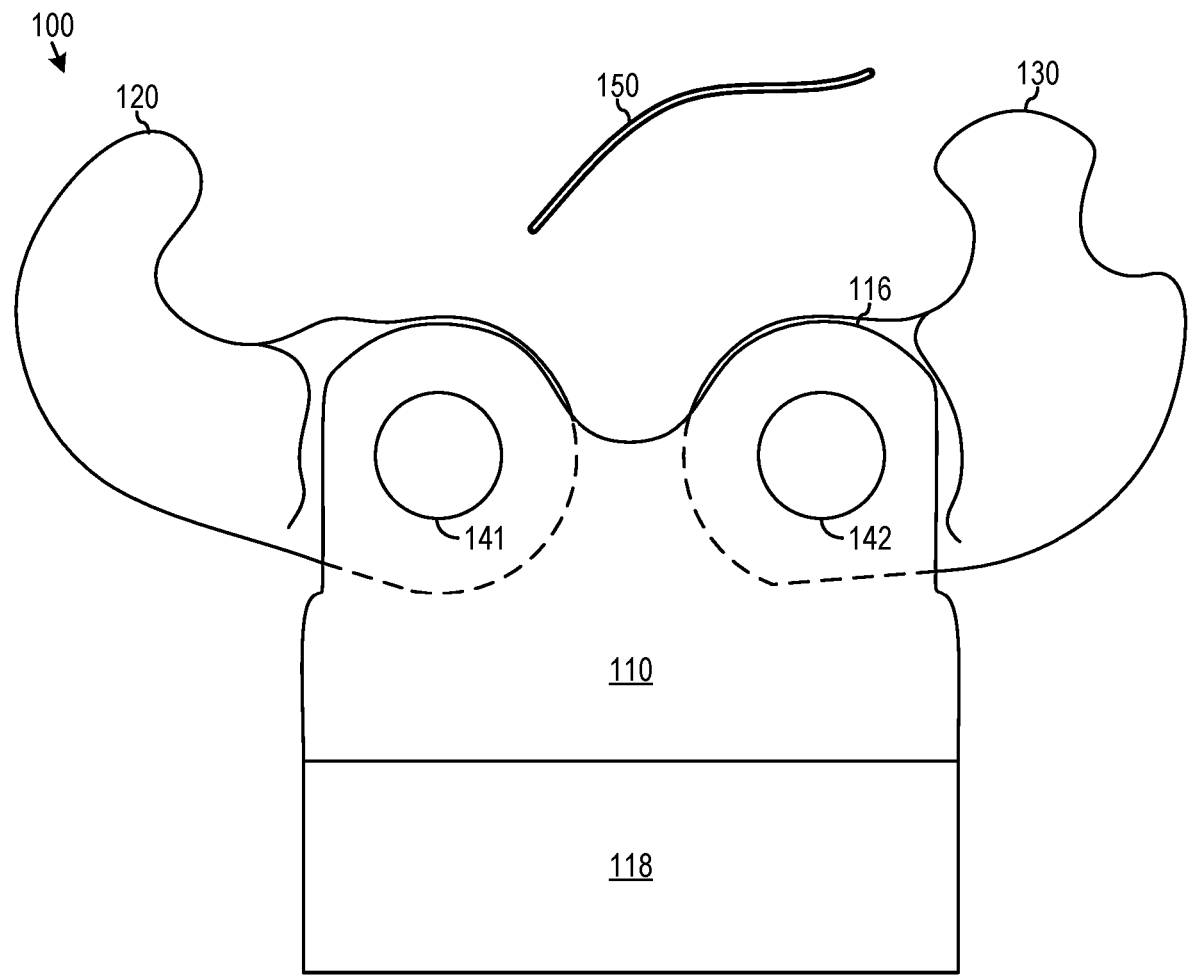
FIG. 3 is a side view of the pressure locking clamp of FIG. 1 in an open state.

In this illustrative scenario, after the pressure 108 is relieved, because the lock contact area 122 is exactly perpendicular to the imaginary radial plane 126, the hook arm 120 is readily pivoted away from the lock state shown in FIG. 1 to begin opening the pressure locking clamp 100. After the hook arm 120 is opened, the clasp arm 130 is readily pivoted to complete opening the pressure locking clamp 100 as shown in FIG. 3.

Embodiments of the invention do not have the lock contact area 122 of the hook arm 120 exactly perpendicular to the imaginary radial plane 126 transecting the lock contact area 122 of the hook arm 120 and containing the first axis 102 for pivoting the hook arm 120. Instead, the lock contact area 122 and the imaginary radial plane 126 are approximately perpendicular. As used herein within the specification and claims, approximately perpendicular is defined to mean within ten degrees of exactly perpendicular, and more preferably within three degrees of exactly perpendicular. The pressure 108 inside the eye enclosure 106 presses the lock contact area 132 of the clasp arm 130 against the lock contact area 122 of the hook arm 120. Because the lock contact area 122 and the imaginary radial plane 126 are not exactly perpendicular, this produces a cam action having a circumferential force that tends to pivot of the hook arm 120 around the first axis 102.

In certain embodiments, a slope of the lock contact area 122 is selected so the pressure 108 produces a cam action that impels the hook arm 120 to pivot towards the clasp arm 130, reinforcing the eye enclosure 106. This is achieved when the lock contact area 122 of the hook arm 120 is beyond perpendicular to the imaginary radial plane 126 transecting the lock contact area 122 of the hook arm 120 and containing the first axis 102 for pivoting the hook arm 120. Visually, this corresponds to the hook of the hook arm 120 appearing bent by more than ninety degrees, and hence beyond perpendicular. However, note that the hook arm 120 is typically formed with molding and/or machining operations, and typically not by an actual bending operation. As used herein within the specification and claims, beyond perpendicular is defined to mean an acute angle exists between an outer portion of the lock contact area of the hook arm and an inner portion of the imaginary radial plane between the lock contact area of the hook arm and the first axis for pivoting the hook arm.

In summary, the lock contact area 122 of the hook arm 120 is beyond perpendicular to the imaginary radial plane 126 transecting the lock contact area 122 of the hook arm 120 and containing the first axis 102 for pivoting the hook arm 120. In the closed state shown in FIG. 1, the lock contact area 132 of the clasp arm 130 has a matching slope so that the lock contact areas 122 and 132 of the hook and clasp arms 120 and 130 achieve abutting contact.

In the closed state, the pressure 108 inside the eye enclosure 106 primarily induces a first force 128 and a second force on the hook arm 120. Primarily induces means ignoring typically smaller cam forces and ignoring frictional forces that secondarily arise from the primary forces. The first force 128 is directed in a radial direction away from the first axis 102 and arises from the lock contact areas 122 and 132 pressing against each other. The second force is directed opposite the first force 128 and arises at a bearing of the hook arm 120 for pivoting the hook arm 120 around the first axis 102. The pressure 108 inside the eye enclosure 106 secondarily induces cam action that impels the hook arm 120 to pivot towards the clasp arm 130, reinforcing the eye enclosure 106.

In one embodiment, in the closed state, the lock contact areas 122 and 132 of the hook and clasp arms 120 and 130 are between the imaginary central plane 101 and an imaginary offset plane 129 parallel to the imaginary central plane 101 and containing the first axis 102 for pivoting the hook arm 120. This ensures that that the hook arm 120 is readily pivoted during opening of the pressure locking clamp 100, and ensures that the first force 128 is smaller than the pressure 108 inside the eye enclosure 106 due to the lever arm around the second axis 104. This scalable geometry shares the load nearly symmetrically between the hook and clasp arms 120 and 130 with low stresses and low bending moments on the hook and clasp arms 120 and 130, approximately doubling the load capacity as compared to a clamp without this geometry.

In the closed state, the lock contact areas 122 and 132 of the hook and clasp arms 120 and 130 are generally inclined with an interference slope that prevents the clasp arm 130 from pivoting away from the hook arm 120.

In a preferred embodiment, the lock contact area 122 of the hook arm 120 is beyond perpendicular to the imaginary radial plane 126 and also perpendicular to an imaginary displaced plane 127 transecting the lock contact area 122 of the hook arm 120 and containing a displacement of the first axis 102 for pivoting the hook arm 120 in a perpendicular direction farther away from the imaginary central plane 101. In the closed state, the lock contact area 132 of the clasp arm 130 is also perpendicular to the imaginary displaced plane 127, and the lock contact areas 122 and 132 of the hook and clasp arms 120 and 130 are in abutting contact.

In the closed state, the pressure 108 inside the eye enclosure 106 presses the lock contact area 132 of the clasp arm 130 against the lock contact area 122 of the hook arm 120 into abutting contact with a force having a major component 128 within the imaginary radial plane 126, which transects the lock contact area 122 of the hook arm 120 and contains the first axis 102 for pivoting the hook arm 120. The force also has a minor component perpendicular to the imaginary radial plane 126 that impels pivoting of the hook and clasp arms 120 and 130 toward each other. A selected angle between the imaginary radial plane 126 and the imaginary displaced plane 127 converts a predetermined fraction of the force, which arises from the lock contact areas 122 and 132 pressing against each other due to the pressure 108 inside the eye enclosure 106, into the minor component of the force.

The hook arm 120 further includes a convex-tip contact area 121 and the clasp arm 130 further includes a concave-pocket contact area 131. In the closed state, the minor component of the force arising from the pressure 108 inside the eye enclosure 106 impels pivoting of the hook and clasp arms 120 and 130 toward each other until the convex-tip contact area 121 of the hook arm 120 and the concave-pocket contact area 131 of the clasp arm 130 achieve abutting contact.

In the preferred embodiment, the hook arm 120 further includes a limit contact area 123 and the clasp arm 130 further includes a limit contact area 133. In the closed state, a gap between the limit contact areas 123 and 133 of the hook and clasp arms 120 and 130 allows slight rotation of the clasp arm 130 towards the hook arm 120 upon releasing the pressure 108 inside the eye enclosure 106. Note a similar gap is needed outside the contact areas 121 and 131. The slight rotation is sufficient to allow clearance of the interference slope of the lock contact areas 122 and 132 so the hook arm 120 becomes free to pivot away from the clasp arm 130 after releasing the pressure 108 inside the eye enclosure 106.

Opening the pressure locking clamp 100 includes first pivoting the clasp arm 130 towards the hook arm 120

(counter-clockwise in FIG. 1) for the slight rotation until the gap is eliminated, second pivoting the hook arm 120 away from the clasp arm 130 (counter-clockwise in FIG. 1), and third pivoting the clasp arm 130 away from the hook arm 120 (clockwise in FIG. 1). Closing the pressure locking clamp 100 reverses these steps, although the final slight rotation of the clasp arm 130 can be autonomously provided and passively maintained upon reintroducing the pressure 108 inside the eye enclosure 106. It will be appreciated that the pressure locking clamp 100 could additionally include a keeping link (not shown) that would be manually released before opening the pressure locking clamp 100.

FIG. 2 is a cross section through the pressure locking clamp 100 of FIG. 1 along section line 1-1. From top to bottom in FIG. 2, the various hatchings represents cross sections through the hook arm 120, the clasp arm 130, and the base 110. In FIG. 2, heavy lines denote the clasp arm 130, with the heavy dashed line denoting a selected hidden edge of the clasp arm 130 and heavy dot-dash lines denoting projections of selected edges of the clasp arm 130 behind the viewing direction of the section line 1-1 shown in FIG. 1.

In one embodiment, the pressure locking clamp 100 is machined from a cylindrical billet having a symmetry axis 109. Besides machining, the pressure locking clamp 100 can be formed from other operations, such a molding. The pressure locking clamp 100 can have other shapes, such as rectangular. Possible materials for the cylindrical billet include, but are not limited to, metals, ceramics, plastics, or composites. As shown, the jaws of the hook and clasp arms 120 and 130 extend across nearly the full diameter of the cylindrical billet at the lock contact areas 122 and 132 of the hook and clasp arms 120 and 130.

The pressure locking clamp 100 further includes a first bearing including a first axel 141 extending along the first axis 102 for pivoting the hook arm 120. A hole of the hook arm 120 receives the first axel 141 carried on a yoke 116 of the base 110. A second bearing includes a second axel 142 extending along the second axis 104 for pivoting the clasp arm 130. A hole of the clasp arm 130 receives the second axel 142 carried on the yoke 116 of the base 110.

FIG. 3 is a side view of the pressure locking clamp 100 of FIG. 1 in an open state with the hook and clasp arms 120 and 130 pivoted away from each other. In one embodiment, the pressure locking clamp 100 further comprises a line 150, such as a chain, a cable, a rope, or a hawser. For example, a cargo container has an instance of the pressure locking clamp 100 at each of four upper corners of the cargo container, and the line 150 for each instance is a loop of a harness for lifting the cargo container.

The line 150 passes through the eye enclosure 106 while the pressure locking clamp 100 is in the closed state as shown in FIG. 1 and FIG. 2. After releasing the pressure 108 inside the eye enclosure 106 arising from a tension on the line 150, the line 150 is released from the eye enclosure 106 upon pivoting the hook arm 120 away from the clasp arm 130 and subsequently pivoting the clasp arm 130 away from the hook arm 120 to achieve the an open state of the pressure locking clamp 100 shown in FIG. 3.

In one embodiment, the pressure locking clamp 100 includes an optional joint 118, such as a U-joint or a ball joint, for attaching the base 110 to the support. When the pressure locking clamp 100 is closed, the joint 118 helps ensure that tension on the line 150 acts to provide the pressure 108 inside the eye enclosure 106 of FIG. 1 that is aligned along the symmetry axis 109 of FIG. 2. This further enhances robust operation of the pressure locking clamp 100 under heavy loads.

From the above description of the Pressure Locking Clamp, it is manifest that various techniques may be used for implementing the concepts of clamp 100 without departing from the scope of the claims. The described embodiments are to be considered in all respects as illustrative and not restrictive. The clamp 100 disclosed herein may be practiced in the absence of any element that is not specifically claimed and/or disclosed herein. It should also be understood that clamp 100 is not limited to the particular embodiments described herein, but is capable of many embodiments without departing from the scope of the claims.

We claim:

1. A pressure locking clamp comprising:
   a base for attaching to a support, an imaginary central plane dividing the base into a first and second half, and the base including a restraint contact area at a juncture between the first and second halves;
   a hook arm pivoting on the first half of the base around a first axis parallel to the imaginary central plane, the hook arm including a convex-tip, lock, limit, and restraint contact area in this order from an extremity of the hook arm to a shank of the hook arm proximate the first axis; and
   a clasp arm pivoting on the second half of the base around a second axis parallel to the imaginary central plane, the clasp arm including a concave-pocket, lock, limit, and restraint contact area in this order from an extremity of the clasp arm to a shank of the clasp arm proximate the second axis,
   wherein in a closed state of the pressure locking clamp:
      the restraint contact areas of the base and the hook and clasp arms together form an eye enclosure, and
      pressure inside the eye enclosure presses a lock contact area of the clasp arm against a lock contact area of the hook arm, and this inhibits the hook and clasp arms from pivoting away from each other, reinforcing the eye enclosure;
   wherein for the closed state:
      the pressure inside the eye enclosure presses the lock contact areas of the hook and clasp arms into abutting contact that produces a force with a major and minor component, and the minor component impels pivoting of the hook and clasp arms toward each other;
      the minor component of the force, which arises from the lock contact areas pressing against each other due to the pressure inside the eye enclosure, presses a convex-tip contact area of the hook arm and a concave-pocket contact area of the clasp arm into abutting contact; and
      a gap between a limit contact area of the hook arm and a limit contact area of the clasp arm allows slight rotation of the clasp arm towards the hook arm upon releasing the pressure inside the eye enclosure, the slight rotation providing sufficient clearance for the hook arm to freely pivot away from the clasp arm after releasing the pressure inside the eye enclosure.

2. A pressure locking clamp comprising:
   a base for attaching to a support, an imaginary central plane dividing the base into a first and second half;
   a hook arm pivoting on the first half of the base around a first axis parallel to the imaginary central plane; the hook arm including a lock contact area;
   a clasp arm pivoting on the second half of the base around a second axis parallel to the imaginary central plane; the clasp arm including a lock contact area,
   wherein in a closed state of the pressure locking clamp:

the hook and clasp arms and the base together form an eye enclosure, and pressure inside the eye enclosure presses the lock contact area of the clasp arm against the lock contact area of the hook arm, and this inhibits the hook and clasp arms from pivoting away from each other, reinforcing the eye enclosure; and wherein the lock contact area of the hook arm is approximately perpendicular to an imaginary radial plane transecting the lock contact area of the hook arm and containing the first axis for pivoting the hook arm.

3. The pressure locking clamp of claim 2, wherein, in the closed state, the imaginary central plane bisects the eye enclosure.

4. The pressure locking clamp of claim 2, further comprising:

a first bearing including a first axel extending along the first axis for pivoting the hook arm, a hole of the hook arm receiving the first axel carried on a yoke of the base; and a second bearing including a second axel extending along the second axis for pivoting the clasp arm, a hole of the clasp arm receiving the second axel carried on the yoke of the base.

5. The pressure locking clamp of claim 2, further comprising a line, which is selected from the group consisting of a chain, a cable, a rope, and a hawser, the line passing through the eye enclosure while the pressure locking clamp is in the closed state, wherein, after releasing the pressure inside the eye enclosure arising from a tension on the line, the line is released from the eye enclosure in an open state of the pressure locking clamp upon pivoting the hook arm away from the clasp arm and subsequently pivoting the clasp arm away from the hook arm.

6. A pressure locking clamp comprising:

a base for attaching to a support, an imaginary central plane dividing the base into a first and second half;

a hook arm pivoting on the first half of the base around a first axis parallel to the imaginary central plane; the hook arm including a lock contact area;

a clasp arm pivoting on the second half of the base around a second axis parallel to the imaginary central plane; the clasp arm including a lock contact area, wherein in a closed state of the pressure locking clamp:
the hook and clasp arms and the base together form an eye enclosure, and
pressure inside the eye enclosure presses the lock contact area of the clasp arm against the lock contact area of the hook arm, and this inhibits the hook and clasp arms from pivoting away from each other, reinforcing the eye enclosure; and wherein the lock contact area of the hook arm is beyond perpendicular to an imaginary radial plane transecting the lock contact area of the hook arm and containing the first axis for pivoting the hook arm.

7. The pressure locking clamp of claim 6, wherein, in the closed state, the lock contact area of the clasp arm is also beyond perpendicular to the imaginary radial plane and the lock contact areas of the hook and clasp arms are in abutting contact.

8. The pressure locking clamp of claim 7, wherein, in the closed state, the pressure inside the eye enclosure primarily induces a first and second force on the hook arm, the first force directed in a radial direction away from the first axis and arising from the lock contact areas pressing against each other, and the second force directed opposite the first force and arising at a bearing of the hook arm for pivoting the hook arm around the first axis.

9. The pressure locking clamp of claim 8, wherein, in the closed state, the pressure inside the eye enclosure secondarily impels pivoting of the hook and clasp arms toward each other.

10. The pressure locking clamp of claim 9, wherein, in the closed state, the lock contact areas of the hook and clasp arms are between the imaginary central plane and an imaginary offset plane parallel to the imaginary central plane and containing the first axis for pivoting the hook arm.

11. The pressure locking clamp of claim 10, wherein, in the closed state, the lock contact areas of the hook and clasp arms are inclined with an interference slope that prevents the clasp arm from pivoting away from the hook arm.

12. The pressure locking clamp of claim 6, wherein, in the closed state, the imaginary central plane bisects the eye enclosure.

13. The pressure locking clamp of claim 6, further comprising:

a first bearing including a first axel extending along the first axis for pivoting the hook arm, a hole of the hook arm receiving the first axel carried on a yoke of the base; and a second bearing including a second axel extending along the second axis for pivoting the clasp arm, a hole of the clasp arm receiving the second axel carried on the yoke of the base.

14. A pressure locking clamp comprising:

a base for attaching to a support, an imaginary central plane dividing the base into a first and second half;

a hook arm pivoting on the first half of the base around a first axis parallel to the imaginary central plane; the hook arm including a lock contact area;

a clasp arm pivoting on the second half of the base around a second axis parallel to the imaginary central plane; the clasp arm including a lock contact area, wherein in a closed state of the pressure locking clamp:
the hook and clasp arms and the base together form an eye enclosure, and
pressure inside the eye enclosure presses the lock contact area of the clasp arm against the lock contact area of the hook arm, and this inhibits the hook and clasp arms from pivoting away from each other, reinforcing the eye enclosure; and wherein the lock contact area of the hook arm is perpendicular to an imaginary displaced plane transecting the lock contact area of the hook arm and containing a displacement of the first axis for pivoting the hook arm in a perpendicular direction farther away from the imaginary central plane.

15. The pressure locking clamp of claim 14, wherein, in the closed state, the lock contact area of the clasp arm is also perpendicular to the imaginary displaced plane and the lock contact areas of the hook and clasp arms are in abutting contact.

16. The pressure locking clamp of claim 15, wherein, in the closed state, the lock contact areas of the hook and clasp arms are inclined with an interference slope that prevents the clasp arm from pivoting away from the hook arm.

17. The pressure locking clamp of claim 16, wherein, in the closed state, the pressure inside the eye enclosure presses the lock contact area of the clasp arm against the lock contact area of the hook arm with a force having a major component within an imaginary radial plane transecting the lock contact area of the hook arm and containing the first axis for pivoting the hook arm, the force also having a minor component perpendicular to the imaginary radial plane that impels pivoting of the hook and clasp arms toward each other.

18. The pressure locking clamp of claim 17, wherein an angle between the imaginary radial plane and the imaginary displaced plane is selected to convert a predetermined minor fraction of the force, which arises from the lock contact areas pressing against each other due to the pressure inside the eye enclosure, into the minor component of the force.

19. The pressure locking clamp of claim 17, wherein the hook arm further includes a convex-tip contact area and the clasp arm further includes a concave-pocket contact area, and, in the closed state, the minor component of the force arising from the pressure inside the eye enclosure impels pivoting of the hook and clasp arms toward each other until the convex-tip contact area of the hook arm and the concave-pocket contact area of the clasp arm achieve abutting contact.

20. The pressure locking clamp of claim 17, wherein the hook arm further includes a limit contact area and the clasp arm further includes a limit contact area, and, in the closed state, a gap between the limit contact areas of the hook and clasp arms allows slight rotation of the clasp arm towards the hook arm upon releasing the pressure inside the eye enclosure, the slight rotation sufficient to allow clearance of the interference slope so the hook arm becomes free to pivot away from the clasp arm after releasing the pressure inside the eye enclosure.

* * * * *